Aug. 21, 1956

R. G. LEGROS 2,759,375

TRANSMISSION MECHANISMS BETWEEN AXLES OR SHAFTS

Filed April 23, 1952

Inventor
Robert G. Legros
By Ralph B. Stewart
Attorney

United States Patent Office 2,759,375
Patented Aug. 21, 1956

2,759,375

TRANSMISSION MECHANISMS BETWEEN AXLES OR SHAFTS

Robert Guy Legros, Sevres, France

Application April 23, 1952, Serial No. 283,851

Claims priority, application France April 28, 1951

1 Claim. (Cl. 74—796)

The present invention relates to improvements in or relating to means for transmitting an angular displacement of a driving axle to one or a plurality of driven axles.

An object of the invention is to provide improved means for repeating angular displacements wherein any finite angular rotation of a driving axle must correspond to a finite angular rotation of any driven axle in a predetermined ration of the amplitudes of said two rotations.

Another object of the invention is to provide improved means for transmitting an angular speed wherein any rotational speed of a finite value of the driving axle must correspond to a finite angular speed of the driven axle, or of any driven axle, in a predetermined ratio of the rotational speeds of said axles.

It is a further object of the invention to provide angle and speed repeaters wherein the ratios of the amplitudes of the rotations or speeds of rotation can be varied at will, through a continuous adjustment, within relatively large or broad bands of values of angular motions or speed values.

It is a further object of the invention to provide improved means such as hereinabove defined wherein said adjustments of angular motions of speed values can be varied on either side of a zero point; in other words, said means operating through a continuous adjustment to reverse the sense of the rotation of a driven axle, at least, with respect to the sense of the rotation of a driving axle, passing through a "dead point" for which the driven axle remains still whilst the driving axle rotates.

The invention will be explained with reference to the accompanying drawings, in which.

Figure 1:
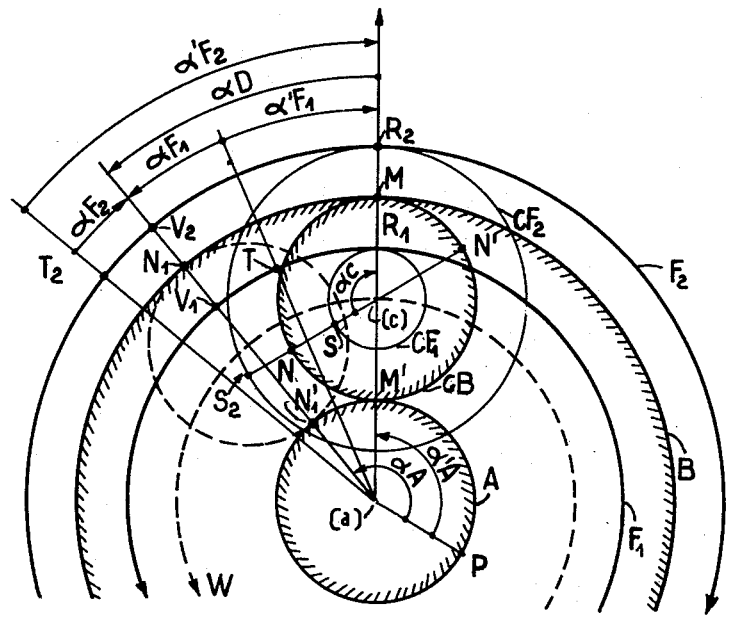
Fig. 1 shows a diagram relating to a displacement translation device according to the invention, for explaining the inherent properties of such a displacement translating device.

Referring first to Fig. 1, a roller or smooth wheel CB is driven in rotation around its axis $c$, for instance, by an angular displacement $\alpha_c$. Said roller CB is guided between two elements, viz. a roller or smooth wheel A and a ring B, and only displaces by rolling without sliding between said guiding elements. The axis $c$ of said roller CB can thus be driven along the circumference W and said movement will be effected in the direction of the arrow W, if the roller CB rotates on itself according to the direction shown by the arrow marked along the reference $\alpha_c$. One of the guiding elements, at least, is still, for instance the ring B. The initial position of the roller CB is such as indicated by its contact points, M with the ring B and M' with the smooth wheel A.

When the roller CB has rotated by an angle $\alpha_c$, point N of its periphery is brought at $N_1$ in contact with the still ring B. The angle $\alpha_D$ by which has moved the center $c$ of said roller CB is defined by the relation $NM=N_1M$.

If now one considers a roller $CF_1$ upon the same axis $c$ as the roller CB, said roller $CF_1$ not being able to rotate with respect to CB, and rolling without sliding upon an annular ring $F_1$ of axis $a$, free on said axis $a$, the rotation $\alpha_c$ imparted to said roller $CF_1$ brings into contact the point S of $CF_1$ and the point $T_1$ of $F_1$ at the same place marked $V_1$. The rotation angle of $CF_1$ within $F_1$ is $\alpha'_{F_1}$ such that $SR_1$ equals $T_1R_1$. $R_1$ designates the contact point at the initial position of the roller $CF_1$ with respect to the ring $F_1$.

For this ring $F_1$, all is such that said ring be first rotated by an angle $-\alpha'_{F_1}$ in one direction and then a rotation by an angle $\alpha_D$ in the reverse direction. The combination of these two angular displacements gives the final relation:

$$\alpha_{F_1}=\alpha_D-\alpha'_{F_1} \qquad (1)$$

and the ring $F_1$ rotates in the direction of the arrow it bears.

The radius of the concerned roller $CF_1$ has been taken lower than the radius of the roller CB.

If, on the other hand, one considers a roller $CF_2$ upon the axis $c$ of the roller CB, said roller $CF_2$ rolling without sliding within a ring $F_2$, freely mounted on the axis $a$, the rotation $\alpha_c$ imparted to said roller $CF_2$ brings into contact, at the place marked $V_2$, points $S_2$ of $CF_2$ and $T_2$ of $F_2$. The rotation angle of $CF_2$ within $F_2$ is $\alpha'_{F_2}$ such that $S_2R_2$ equals $T_2R_2$. $R_2$ designates the initial contact point of the roller $CF_2$ and the ring $F_2$.

For this ring $F_2$, all stands as if said ring has first been rotated by $-\alpha'_{F_2}$ and then a reversed rotation by $\alpha_D$. The combination of these two rotations gives the final result:

$$\alpha_{F_2}=\alpha_D-\alpha'_{F_2} \qquad (2)$$

and the ring $F_2$ rotates in the direction of the arrow it bears.

The radius of the concerned roller $CF_2$ has been taken higher than the radius of the roller CB.

The rotations $\alpha'_F$ of the rings F of all radii are of opposite directions with respect to the rotation $\alpha_D$ and, according whether their values are or not lower than that of $\alpha_D$, said rings are driven in the one or the other directions. This direction of drive is dependent on the relative values of the radii of the rollers CF with respect to the radius of the roller CB. In Fig. 1, when the radius of the roller CF is equal to that of the roller CB, the ring F is stilled. This is as well for a limited drive of the roller CF as well as for a permanent or continuous drive of said roller at any angular speed.

It must be noted that, with respect to the drive of the roller A from the roller CB, the point P of the roller A is brought at $N'_1$ and not at M', for an angular displacement $\alpha_c$ of the roller CB upon itself. The rotation $\alpha'_A$ is of a direction reverse to that of a rotation $\alpha'_F$ so that the final rotation of the roller A is:

$$\alpha_A=\alpha_D+\alpha'_A \qquad (3)$$

The above-described properties of a drive such as in Fig. 1 do not depend upon the driving means of the roller CB as the axis $c$ is not necessarily the driving axis. It is apparent, for instance, that a rotation of the roller A can control the rotation of the roller CB both upon itself and upon the axis $a$, the ring B only ensuring a guiding for the angular displacement of the roller CB.

Any one of the components of the structure can be taken as a driving element, with the exception of one of them which has to be still so as to define the relative drives of the other elements.

It must be noted that no practical limitation occurs from the fact that two elements have coincident axis as it suffices to complete the embodiment by means of an auxiliary transmission between one of the rings F, for instance, and an axle of different axis than the axis $a$, for driving the latter by the driving element of the system within any mechanically operable ratio of amplitudes or speeds.

Designating $r_{CF}$ the radius of a roller CF clamped upon the axis $c$ of the roller CB, and by $r_F$ the radius of the ring F driven by said roller CF, one has:

$$\alpha_c \cdot r_{CF} = \alpha'_F \cdot r_F \quad (4)$$

and designating $r_{CB}$ the radius of the roller CB and $r_B$ the radius of the ring B driven or not, one has:

$$\alpha_c \cdot r_{CB} = \alpha_D \cdot r_B \quad (5)$$

From the Relation 1 or 2, the further relation is then obtained:

$$\alpha'_F = \alpha_c \cdot (r_{CB}/r_B - r_{CF}/r_F) \quad (6)$$

which, for any value of $\alpha_c$, becomes identical to zero when the geometrical relation is observed:

$$\frac{r_{CF}}{r_F} = \frac{r_{CB}}{r_B}$$

and said latter relation can be written:

$$r_{CF_0} = r_{CB} \cdot \frac{r_F}{r_B} \quad (7)$$

If the quantities $r_{CB}$, $r_F$ and $r_B$ are invariant, any ring F of radius $r_{CF}$ higher than $r_{CF_0}$ will be driven in one direction of rotation and any ring F of radius lower than $r_{CF_0}$ will be driven in the other direction of rotation.

In a more definite manner, the object of the invention is to provide an arrangement such that a transmission ratio between a driving element and a driven element, of same rotation axis, can be varied in accordance with the above, and more particularly that such a variation can be made in a progressive and continuous manner with a reversal of the direction of rotation on either side of a dead point for which no transmission occurs; said ratio and its variation and said dead point being solely determined by geometrical parameters of the mechanism of transmission.

Figure 2:
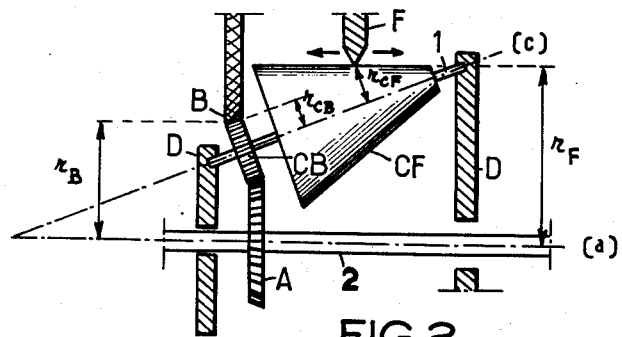
Fig. 2 shows the general arrangement according to the invention of such a device.

Fig. 2 partially shows, in a partial cross-section, a typical scheme of such a mechanism ensuring the transmission of an angular displacement with variable ratio and reversible sign between a driving and driven elements; let said driven element be the ring F and the driving element be one of the component parts A, B or D; one of the undriving elements being still and the other free around the axis $a$, that latter being also possibly considered as a second driven element.

The transmission ratio between the driving element and that of the driven elements to consider can be established from the Relations 1 to 6 and from the complementary relation:

$$\alpha_c \cdot r_{CB} = \alpha'_A \cdot r_A \quad (8)$$

between the elements CB and A.

In the diagram in Fig. 2, elements A, D, B, F are arranged for revolution around the axis $a$ and the element D though indicated in two parts is consituted as a unitary cage structure for supporting at least one axle 1, of axis $c$ having a fixed slope, not equal to zero but lower than 90°, with respect to the axis $a$. A plurality of axles such as 1 can be distributed around said axle 1, all with the same slope, and in practice, several axles 1 are to be provided with a uniform distribution around the axis $a$ for balancing the mechanism around said axis.

The provision of said axle 1, of axis $c$ with a determined slope with respect to the axis $a$, requires a connection through conical gears to be provided between the elements A, B and CB. The radius of the part CB of said gear and the internal radius of the part B, given by constructional data, define the fixed ratio $r_{CB}/r_B$ which has been cited above.

Upon the axle 1 which is shown—and upon any axle 1 thus provided—a conical element CF is clamped, the apex angle of which is equal to the fixed angle between the axes $a$ and $c$. The internal radius of the ring F is thus determined, said ring F being concentric with axis $a$ and constituting for instance the driven member of the mechanism. Further said ring F is so provided as to have its longitudinal position axially varied or shifted in the one and the other directions as indicated by the arrows. Such an axial shift corresponds to a change of the radius $r_{CF}$ and the mechanism thus realises the possibility of adjusting, by changing the axial position of said ring F, the angular transmission ratio between F and the driving element of the mechanism, on either side of a position wherein $r_{CB}/r_B$ equals $r_{CF_0}/r_F$ and for which the mechanism is at a dead point since F is stilled or stationary.

In the following, and for the sake of clearness, element A will be considered as the driving element, being driven itself by an axle 2, and the element B will be considered as fixed; these conditions not being limitative per se.

Figure 3:
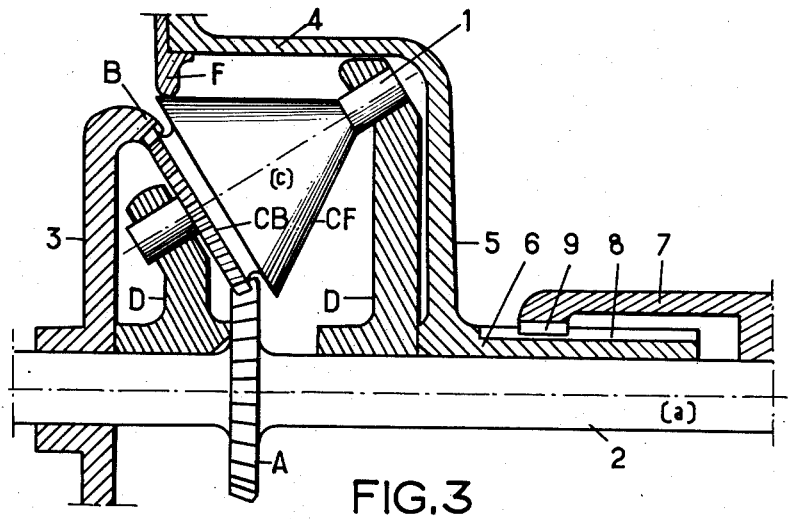
Fig. 3 is a more elaborate embodiment of a displacement translating device featuring the invention.

In such a case, an embodiment of a transmission device according to the invention is more completely shown in Fig. 3. Both parts D supporting the axles 1 constitute together a cage mounted for rotation around the axle 2. The ring B is supported by a member 3 affixed upon an unshown support casing. The ring F is supported through a sleeve 4 integral for instance with a disc portion 5 itself integral with a further sleeve 6, of axis $a$, freely rotating around the axle 2. The driven axle 7 is hollow, also of axis $a$ and its link with the sleeve 6 may be ensured by one or more fingers such as 9 located within axial slots 8 of said sleeve 6. Thus the unitary structure 6—5—4 which bears the ring F can have its axial position varied for varying the annular contact place between the ring F and the conical rollers CF.

Preferably but not imperatively, the axle 1, the conical rollers CF and the gearing part CB of each roller CF are formed from one piece. In certain embodiments, however, there will be some advantage to have the roller CF not integral with its axle and on the other hand to enable a small displacement of the conical roller CF upon its axle, said roller being then pressed by means of a spring action towards the part of higher diameter of the support D (or either under the mere action of the centrifugal force). This ensuring a good friction contact between the parts CF and F during the working periods of the mechanism.

It is apparent that the rotation couple transmissible from the axle 2 to the axle 7 will chiefly depend upon the number of conical rollers CF distributed around the axle 2 in the supporting cage D.

It is also apparent that the precision of the adjustment of the ratio will be increased if the angle between the axis $a$ and any axis $c$ be reduced, and that the range of its variations will increase if the conical rollers CF are axially lengthened, hence the range of adjustment of the axial position of the ring F is increased.

It is further apparent that the surfaces in contact in the rollers CF and the ring F must be treated for having a good wear resistance (for instance by a special finishing process if necessary), the drive at this place of the mechanism being only ensured by the friction between said elements. On the other hand, the drive of the elements CB by the element A can most advantageously be ensured by means of conical toothed gears.

Figure 4:
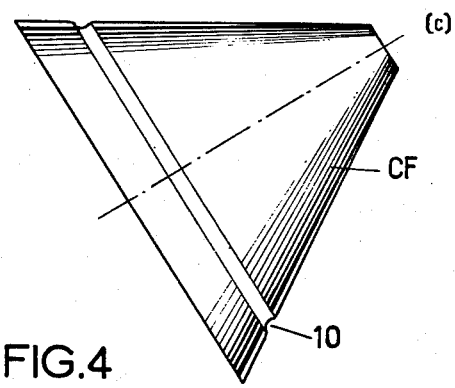
Fig. 4 shows an enlarged view of one of the components in Fig. 3.

As concerns the position of the dead point of such a mechanism, and in order to avoid a rolling and a damaging of the rollers, it is further provided to create in the surface of any conical roller CF an annular depression, shown at 10 on the enlarged part in Fig. 4 of a conical roller CF. Said depression being equally distributed as for its width on either sides of the dead point line. The depth of such a depression is necessarily very small and no weakening of the mechanical resistance of the rollers is thus entailed.

For illustrative purposes, considering a mechanism such as shown in Fig. 3, for the transmission of small value mechanical forces, the following values can be given as suitable:

Angle between axes $a$ and $c=32°$;
External radius of the toothed sun gear A=20 mm.;
Internal radius of the toothed ring gear B=50 mm.;
Radius of the toothed satellite gears CB=17.5 mm.;
Radius of the ring F=60 mm.;
Axial displacement of the ring F along the surface of any conical roller CF=38 mm.;
Minimum and maximum radii of any roller CF=4 mm. and 25 mm., respectively;
Values of the maximum and minimum transmission ratio=1/4.32 and −1/18.35;
Dead point at a radius $r_{CF}$ equal to 21 mm.

Figure 5:
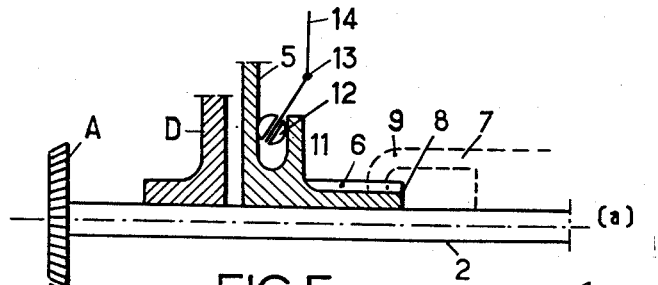
Fig. 5 shows a schematic illustrative embodiment of adjusting means for such a translation device; and, Fig. 6 shows an illustrative embodiment of an angular displacement translating device according to the invention.

Fig. 5 shows a possible embodiment of a control means for shifting the axial position of the ring F with respect to the conical rollers, hence for determining the value of the transmission ratio between the axles 2 and 7. A circuar depression 11 is provided within the sleeve 6 and in said depression is located a spherical roller 12 at the end of a lever 14 pivoted at 13 around a fixed point. Any operation of the lever 14 around said pivoting point 13 brings an axial displacement in either directions of the ring F, hence a change in the value of the transmission ratio.

Figure 6:
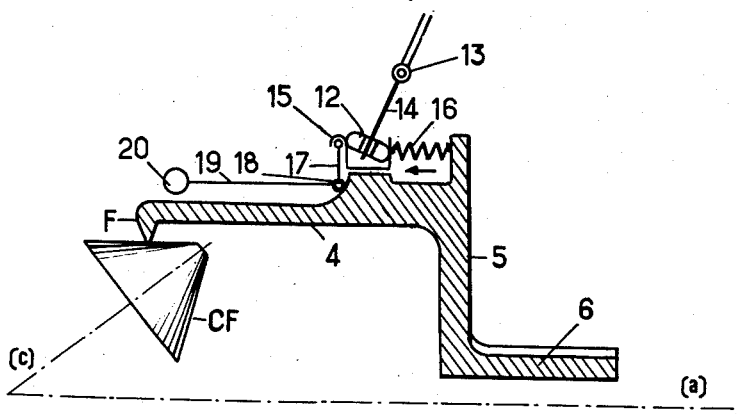

Fig. 6 indicates a simple means for regulating the speed of rotation of an axle 8, for a determined position of the ring F, when the speed of rotation of the axle 2 has a tendency to drift. Said regulating arrangement is intended for the case when the mechanism is used as a transmission of rotations between two shafts. On the other hand, the control device in Fig. 5 was intended mainly for angle repeater.

A two depression annular portion 15 is so mounted as to slide along the external surface of the part 4. A compression spring 16 presses said annular element 15 in the direction indicated by the arrow.

The end 17 of a cranked lever 17—19 pivoted at 18 upon the cylinder 4 engages one of said depressions in the element 15. At the other end, said lever carries a ball 20. The axle 18 being fixed, the element 15 can advance only to the point where the ball 20 presses against the wall of the cylinder 4 when the spring 16 acts alone.

The other depression in the annular element 15 receives the spherical roller 12 of the speed controlling lever. By this means, the position of the annular element 15 depends upon the condition or position of the lever 14.

The operation of said regulating arrangement can be easily understood by considering the ring F driven at a certain speed so that a centrifugal force is exerted upon the spherical ball 20, the value of said force corresponding to said speed, which repels to the right the annular element 15 against the action of the spring 16. A balance is automatically obtained in continuous operation if the rotation driving speed of the ring F is stable. If said speed varies around the value set by the lever 14, however, the centrifugal force exerted on the ball 20 changes. An unbalance results between the actions of the lever 17—19 and the spring 16, hence an axial displacement of the ring F together with the linking parts between said ring F and the driven axle 7. If, for instance, the driving speed of F has a tendency to increase, the centrifugal force increases, the spring 16 is compressed and, the annular element 15 being maintained in its position through the lever 14, an axial translation of F occurs in the direction of the increasing radii of the rollers CF, hence in the direction of the decreasing driving speeds. It is apparent that the regulating action may be obtained from an appropriate calibration of the spring 16, together with the lever arms 17—19 and the mass of the ball 20.

Several regulating arrangements of this kind can, if required, be arranged around a single annular element 15.

Also, at some technological point of view, the scheme of Fig. 3 can be modified without departing from the scope of the invention, as applied to repeaters of angular displacements and/or speeds, in accordance with the general features disclosed in the arrangements of Figs. 1 and 2 of the drawings and in accordance with the appended claim.

Certain subject-matter disclosed herein is being claimed in a continuation-in-part application No. 580,541, filed on April 25, 1956.

Having now ascertained and described the invention, I declare that I claim:

In combination, a first element comprising a main axle and a sun gear secured thereto at a point intermediate its ends; a second element comprising a ring gear surrounding said main axle and being journalled to rotate about the axis of said main axle; a third element comprising a cage surrounding said axle and having spaced portions thereof journalled upon said axle on opposite sides of said sun gear, a plurality of satellite axles mounted on said cage for rotation about individual axes inclined to the axis of said main axle by an angle of less than 90°, a satellite gear carried by each satellite axle and having meshing engagement with said sun gear and with said ring gear, and a conical roller carried by each satellite gear and having an apex angle such that the outer surfaces of said conical rollers are parallel with the axis of said main axle; and a fourth element comprising an annular ring having frictional contact with the outer surfaces of said conical rollers, means for mounting said annular ring for rotation about the axis of said main axle and for sliding movement parallel with said axle; whereby upon holding stationary one of said four elements and driving another of said elements, the remaining two elements are driven from the rotation of the driving element, a control ring surrounding said main shaft and being slidable axially thereof, a control lever for shifting said ring to different axial positions, spring means carried by said annular ring and acting on said control ring tending to shift said control ring in one axial direction, and centrifugal regulator means carried by said annular ring and acting upon said control ring tending to shift said control ring in the opposite axial direction.

References Cited in the file of this patent

UNITED STATES PATENTS

| 1,670,438 | Coleman | May 22, 1928 |
| 1,903,390 | Piercey | Apr. 4, 1933 |
| 2,062,901 | Graham | Dec. 1, 1936 |
| 2,574,530 | Castagna | Nov. 13, 1950 |

FOREIGN PATENTS

| 1,318 of 1908 | Great Britain | Nov. 5, 1908 |